US009239147B2

(12) United States Patent
Jen et al.

(10) Patent No.: US 9,239,147 B2
(45) Date of Patent: Jan. 19, 2016

(54) APPARATUS AND METHOD FOR OBTAINING UNIFORM LIGHT SOURCE

(71) Applicant: OmniVision Technologies, Inc., Santa Clara, CA (US)

(72) Inventors: Chih-Pin Jen, HsinChu (TW); Ming-Chang Yang, HsinChu (TW); Sheng-Kuai Yang, HsinChu (TW)

(73) Assignee: Omnivision Technologies, Inc., Santa Clara, CA (US)

( * ) Notice: Subject to any disclaimer, the term of this patent is extended or adjusted under 35 U.S.C. 154(b) by 494 days.

(21) Appl. No.: 13/671,335

(22) Filed: Nov. 7, 2012

(65) Prior Publication Data

US 2014/0125368 A1 May 8, 2014

(51) Int. Cl.
*B60Q 1/26* (2006.01)
*F21V 14/00* (2006.01)
*H05B 37/02* (2006.01)

(52) U.S. Cl.
CPC ................ *F21V 14/00* (2013.01); *H05B 37/02* (2013.01)

(58) Field of Classification Search
CPC .......... F21V 14/02; F21V 14/00; H05B 37/02
USPC ................................ 362/232–234, 238–239, 362/249.02–249.03, 249.07–249.11
See application file for complete search history.

(56) References Cited

U.S. PATENT DOCUMENTS

| | | | | |
|---|---|---|---|---|
| 5,298,939 | A * | 3/1994 | Swanson et al. | 355/53 |
| 6,513,962 | B1 * | 2/2003 | Mayshack et al. | 362/583 |
| 6,830,184 | B2 * | 12/2004 | Au et al. | 235/462.01 |
| 6,866,401 | B2 * | 3/2005 | Sommers et al. | 362/268 |
| 7,331,681 | B2 * | 2/2008 | Pohlert et al. | 362/18 |
| 8,596,542 | B2 * | 12/2013 | Havens et al. | 235/462.45 |
| 2004/0031779 | A1 * | 2/2004 | Cahill et al. | 219/121.83 |
| 2009/0002001 | A1 | 1/2009 | Caldwell et al. | |
| 2010/0014807 | A1 * | 1/2010 | Shin et al. | 385/27 |
| 2010/0176831 | A1 | 7/2010 | Palcisko et al. | |
| 2013/0285690 | A1 | 10/2013 | Andberg | |

FOREIGN PATENT DOCUMENTS

| | | |
|---|---|---|
| CN | 101611324 | 12/2009 |
| EP | 0226995 | 7/1987 |
| TW | M356906 | 5/2009 |
| WO | 2004034068 | 4/2004 |
| WO | 2009048618 | 5/2009 |

OTHER PUBLICATIONS

Taiwanese Patent Application 102136842 Office Action received Dec. 2014, 9 pages.
Taiwanese Patent Application 103106858 Office Action dated Dec. 30, 2014, 9 pages.
U.S. Appl. No. 13/787,472 Office action dated Jul. 10, 2015, 21 pages.
Huang, et al., Taiwanese Application 356905, "Probe Testing Device for Testing Imag-Sensing Chip," English Machine Translation, May 11, 2009.

* cited by examiner

*Primary Examiner* — Jason Moon Han
(74) *Attorney, Agent, or Firm* — Lathrop & Gage LLP

(57) ABSTRACT

An apparatus and method for increasing uniformity in light from a light source at a plurality of targets of the light include a plurality of movable aperture elements, locatable between the light source and the targets, each aperture element defining an aperture through which the light passes from the light source to an associated one of the plurality of targets associated with the aperture element along a longitudinal axis of the aperture element. A holder movably holds the plurality of aperture elements, each of the plurality of aperture elements being movable within the holder along the longitudinal axis of the aperture element to change a feature of light incident on the target associated with the aperture element.

5 Claims, 19 Drawing Sheets

| | Without "Ring" tooling | | | | With "Ring" tooling | | | |
|---|---|---|---|---|---|---|---|---|
| SITE | MeanR | MeanG1 | MeanG2 | MeanB | MeanR | MeanG1 | MeanG2 | MeanB |
| 1 | 82.19 | 136.62 | 137.17 | 117.63 | 82.07 | 135.29 | 135.34 | 114.49 |
| 2 | 83.42 | 136.31 | 136.61 | 116.87 | 82.84 | 134.54 | 134.58 | 113.69 |
| 3 | 83.80 | 135.87 | 136.15 | 114.81 | 84.51 | 135.44 | 135.97 | 113.28 |
| 4 | 87.13 | 143.28 | 143.56 | 121.42 | 82.55 | 134.32 | 134.34 | 112.61 |
| 5 | 84.06 | 136.13 | 136.40 | 115.47 | 83.75 | 134.84 | 135.11 | 112.96 |
| 6 | 76.48 | 124.85 | 125.35 | 106.30 | 82.91 | 134.36 | 134.63 | 113.26 |
| 7 | 83.46 | 138.10 | 138.64 | 117.67 | 82.54 | 135.62 | 135.64 | 113.95 |
| 8 | 87.07 | 140.74 | 141.03 | 119.70 | 83.89 | 134.36 | 134.87 | 113.03 |
| 9 | 81.16 | 131.63 | 131.89 | 111.55 | 84.05 | 135.16 | 135.43 | 113.18 |
| 10 | 77.95 | 127.38 | 127.65 | 108.79 | 82.79 | 134.59 | 134.86 | 113.69 |
| 11 | 77.20 | 128.53 | 128.56 | 109.93 | 82.24 | 135.68 | 135.97 | 114.46 |
| 12 | 83.98 | 137.85 | 138.41 | 118.32 | 83.54 | 135.66 | 135.96 | 114.73 |
| 13 | 70.38 | 117.02 | 117.28 | 101.05 | 82.04 | 135.17 | 135.47 | 115.55 |
| 14 | 83.67 | 137.51 | 137.54 | 117.76 | 82.90 | 134.55 | 134.83 | 113.84 |
| 15 | 83.18 | 136.67 | 136.97 | 117.77 | 83.42 | 135.57 | 135.86 | 115.21 |
| 16 | 86.58 | 141.58 | 141.89 | 121.27 | 83.70 | 135.60 | 135.89 | 114.16 |
| Max | 87.13 | 143.28 | 143.56 | 121.42 | 84.51 | 135.68 | 135.97 | 115.55 |
| Min | 70.38 | 117.02 | 117.28 | 101.05 | 82.04 | 134.32 | 134.34 | 112.61 |
| Max-Min | 16.76 | 26.26 | 26.28 | 20.37 ⇨ | 2.46 | 1.36 | 1.64 | 2.95 |
| Average | 81.98 | 134.38 | 134.69 | 114.77 | 83.11 | 135.05 | 135.30 | 113.88 |
| Deviation ratio | 10.22% | 9.77% | 9.76% | 8.87% ⇨ | 1.48% | 0.50% | 0.60% | 1.29% |

FIG. 10

APPARATUS AND METHOD FOR OBTAINING UNIFORM LIGHT SOURCE

BACKGROUND

1. Technical Field

This disclosure relates to manufacturing and testing of integrated image sensors formed on wafers and, more particularly, to an apparatus and method for obtaining a uniform illumination used in testing integrated image sensors.

2. Discussion of Related Art

In the manufacture of image sensors, a large number of image sensing elements can be formed on a single wafer. Multiple image sensing elements formed on a wafer can be tested simultaneously at the wafer level. After fabrication and testing are complete, the image sensing elements are separated such that each sensing element is formed on its own into individual chip die.

When testing at the wafer level, it is common to illuminate each image sensing element and test its performance by detecting an electrical signal generated by and output from the sensing element in response to the illumination. To that end, the testing apparatus typically includes a probe card located between the source of illumination, i.e., light source, and the wafer. For each sensing element being tested at one time, the probe card includes an opening or aperture, which permits light from the light source to reach the wafer. The probe card also includes at least one conductive probe pin which makes contact with the image sensing element to detect the electrical signal generated and output by the sensing element in response to the illumination.

To reduce testing time and cost, it is common to test multiple image sensing elements on a wafer simultaneously. To accommodate simultaneous testing of multiple image sensing elements, the probe card includes multiple apertures, one for each image sensing element being tested, and multiple probe pins, at least one for each image sensing element being tested. The light source that provides the illumination provides the light required to illuminate all of the image sensing elements through all of the respective apertures simultaneously. One drawback to this approach is that, in general, the light source is not perfectly uniform. As a result, the image sensing elements are not all illuminated with light of the same intensity. This results in errors being introduced into the testing of the image sensing elements.

It has been determined that the nonuniformity of the illumination from the light source varies according to distance between the light source and the wafer. That is, as the distance between the light source and the wafer increases, the nonuniformity of the illumination provided by the light source also increases. Accordingly, it would be desirable to maintain the distance between the light source and the wafer as small as possible. However, in the typical testing environment, various system components such as a light diffuser, one or more lenses, and/or probe pins are disposed between the light source and the wafer. Sufficient distance must be provided to accommodate these components. Since the distance between the light source and the wafer is constrained by this space limitation, the uniformity of the illumination at the multiple image sensing elements in conventional systems is limited.

SUMMARY

According to one aspect, an apparatus for increasing uniformity in light from a light source at a plurality of targets of the light is provided. The apparatus includes a plurality of movable aperture elements, locatable between the light source and the targets, each aperture element defining an aperture through which the light passes from the light source to an associated one of the plurality of targets associated with the aperture element along a longitudinal axis of the aperture element. A holder movably holds the plurality of aperture elements, each of the plurality of aperture elements being movable within the holder along the longitudinal axis of the aperture element to change a feature of light incident on the target associated with the aperture element.

According to another aspect, a method of increasing uniformity in light from a light source at a plurality of targets of the light is provided. The method includes locating a plurality of movable aperture elements between the light source and the targets, each aperture element defining an aperture through which the light passes from the light source to an associated one of the plurality of targets associated with the aperture element along a longitudinal axis of the aperture element. At least one of the aperture elements is moved along its longitudinal axis to change a feature of light incident on the target associated with the aperture element.

BRIEF DESCRIPTION OF THE DRAWINGS

The foregoing and other features and advantages will be apparent from the more particular description of preferred embodiments, as illustrated in the accompanying drawings, in which like reference characters refer to the same parts throughout the different views. The drawings are not necessarily to scale, emphasis instead being placed upon illustrating the principles of the preferred embodiments. In the drawings, the sizes and thicknesses of layers, regions and features may be exaggerated for clarity.

FIG. 1B illustrates one probe card unit in detail.

FIG. 10 includes a table which tabulates illumination test data for a plurality of test sites comparing a test system configuration in which the ring control member of the present disclosure is not used to provide uniform illumination at the plurality of test sites with a test system configuration in which the ring control member according to the present disclosure is used to provide uniform illumination at the plurality of test sites.

DETAILED DESCRIPTION OF PREFERRED EMBODIMENTS

Figure 1A:
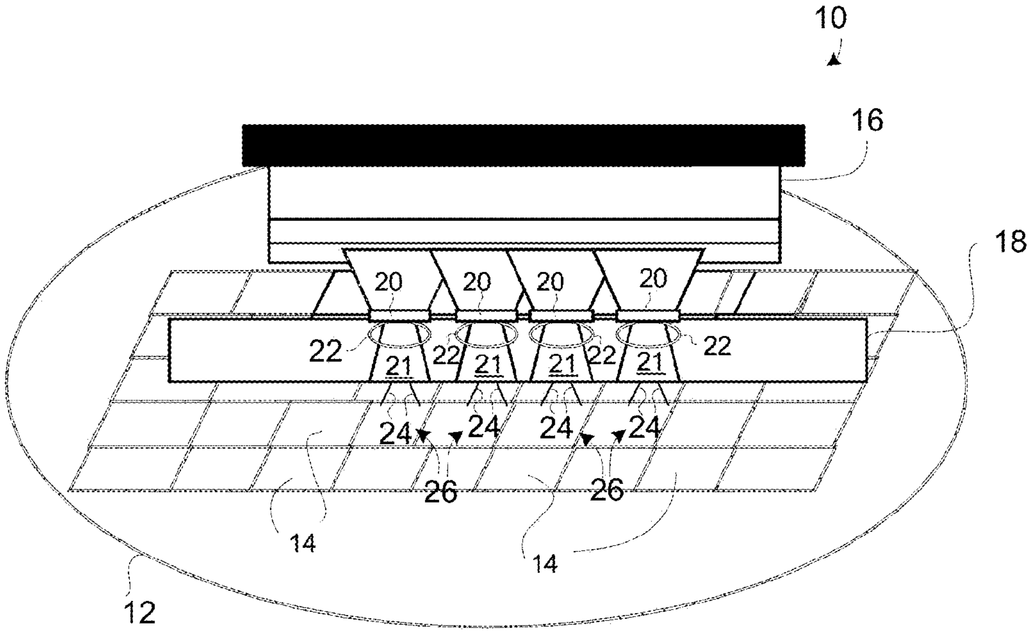
FIG. 1A includes a schematic perspective view of a conventional system used to test a wafer on which a plurality of image sensors is formed.

FIG. 1A includes a schematic perspective view of a conventional system used to test a wafer on which a plurality of image sensors are formed. Referring to FIG. 1A, the wafer 12 includes a plurality of image sensors 14 to be tested. After the testing, wafer 12 will be separated into a plurality of individual chip dies, each of which can include one of the image sensors 14. During the testing carried out by system 10, each of sensors 14 is illuminated with radiation, i.e., light, and the response of the sensor 14 to the illumination is monitored, such as by detecting one or more electrical signals generated by image sensor 14 in response to the illumination.

The test illumination is provided by a light source or illumination source 16. A probe card 18 for simultaneous multi-site testing is positioned between light source 16 and wafer 12. Probe card 18 includes a plurality of probe card units 21 corresponding to a respective plurality of image sensor test sites 26 on wafer 12. The plurality of probe card units 21 includes a respective plurality of diffusers 20 for diffusing the light from light source 16 and a respective plurality of lenses 22 for focusing the diffused light from the diffusers 20 onto respective image sensor test sites 26 on wafer 12. Generally, each of the plurality of image sensor test sites 26 coincides with an image sensor 14 being tested by system 10. The probe card units 21 of probe card 18 also include a respective plurality of probe pin sets 24, each of which is configured to make electrical contact with a respective one of image sensors 14 being tested to detect the electrical response of its respective associated image sensor 14 to the test illumination. Each of probe pin sets 24 can include one or more pogo pins and/or probe pins for contacting its respective associated image sensor 14.

Figure 1B:
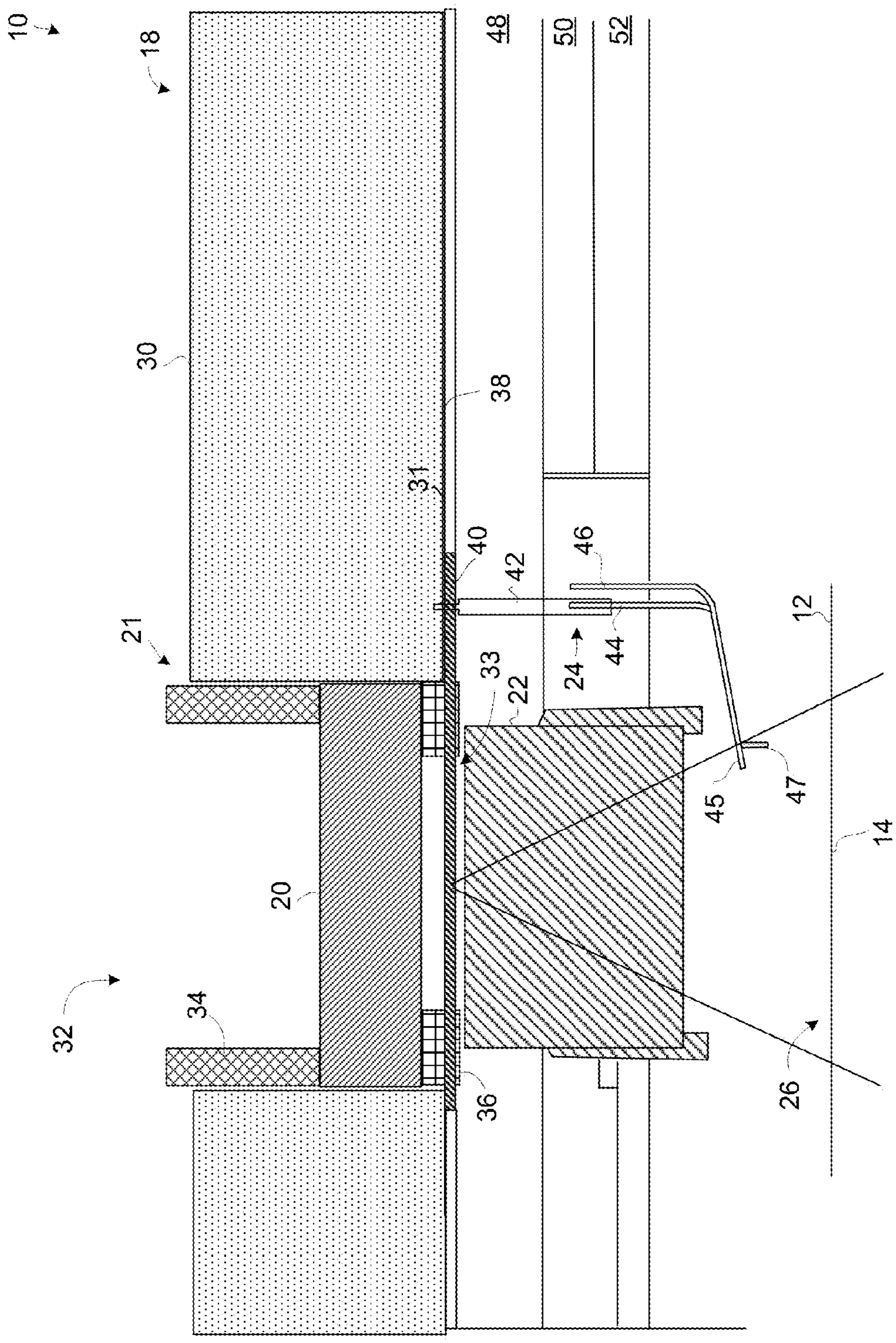
FIG. 1B includes a detailed schematic cross-sectional view of a portion of the probe card illustrated in FIG. 1A. Specifically.

FIG. 1B includes a detailed schematic cross-sectional view of a portion of the probe card 18 illustrated in FIG. 1A. Specifically, FIG. 1B illustrates one probe card unit 21 in detail. Light source 16 (not shown) is positioned above probe card 18. Referring to FIG. 1B, probe card 18 includes a printed circuit board (PCB) layer 30 in which an opening 32 for probe card unit 21 is defined. Diffuser 20 is supported and held within opening 32 by a ceramic tube 34, which holds diffuser 20 against O-ring 36 disposed beneath diffuser 20. A bottom surface 31 of PCB layer 30 can include a conductor pattern 38 printed thereon. Conductor pattern 38 can be covered with a protective insulating layer 40. A spacer 48 can be disposed beneath PCB layer 30. Diffuser 20 can be optically sealed to a top surface of spacer 48 via O-ring 36.

Spacer 48 can be mounted to a rigid structure which provides strength to probe card 18. Specifically, the rigid structure can include an upper die 50 mounted over a lower die 52, both of which can be made of a rigid material such as stainless steel, or other such material. Spacer 48 can be mounted to the top surface of upper die 50.

Illumination light used in testing image sensors 14 passes through diffuser 20 and then through opening 33 and lens 22. Lens 22 is mounted within spacer 48, as shown in FIG. 1B. Light from lens 22 reaches image sensor test site 26 associated with probe card unit 21 of probe card 18. During testing, one of image sensors 14 formed in wafer 12 is located at image sensor site 26 and is illuminated by testing illumination from lens 22.

As noted above, during testing, the response of image sensor 14 is monitored by detecting one or more electrical signals generated by image sensor 14 in response to the testing illumination. To that end, one or more probe pin assemblies or sets 24, each including one or more pogo pins 42, are connected to conductor pattern 38 on PCB layer 30. In probe pin assemblies 24, pogo pins 42 are conductively connected to one or more probe pins 44, 46 having conductive ends 45, 47, which make electrically conductive contact with image sensor 14. The electrical signal(s) generated by image sensor 14 in response to the illumination is(are) conducted via probe pins 44, 46 and pogo pins 42 to conductor pattern 38, which can be monitored such that the electrical signals from image sensor 14 can be used to evaluate performance of image sensor 14.

As noted above, multiple image sensors 14 are tested simultaneously. To that end, probe card 18 includes multiple probe card units 21 associated with multiple image sensor sites 26. In one particular probe card configuration, sixteen (16) dies in a 4×4 matrix configuration can be tested simultaneously, with neighboring probe card units 21 being spaced apart over the distance of several dies.

As noted above, it is important to the testing that the test illumination from light source 16 be uniform, since, for accurate evaluation of image sensors, each image sensor 14 must receive light of the same intensity. This uniformity has been difficult to achieve due to the distance that must be maintained between light source 16 and wafer 12. To make multi-site testing possible, ample space must be maintained between light source 16 and wafer 12 to accommodate components of the system, such as the diffuser, lens, pogo pins, etc. In some systems, a good working distance has been determined to be approximately 25 mm. However, the greater the distance between light source 16 and wafer 12, the less uniform the light illuminance will be.

Illuminance (units: lux) at a surface is the total light flux incident on the surface per unit area. It is a measure of the extent to which a light source illuminates the surface. The greater the distance between the light source and the illuminated surface, the more uneven the illuminance is over the surface. This relationship between separation distance of light source and wafer and illuminance uniformity is illustrated in FIGS. 2 through 4 and the following detailed description.

Figure 2:
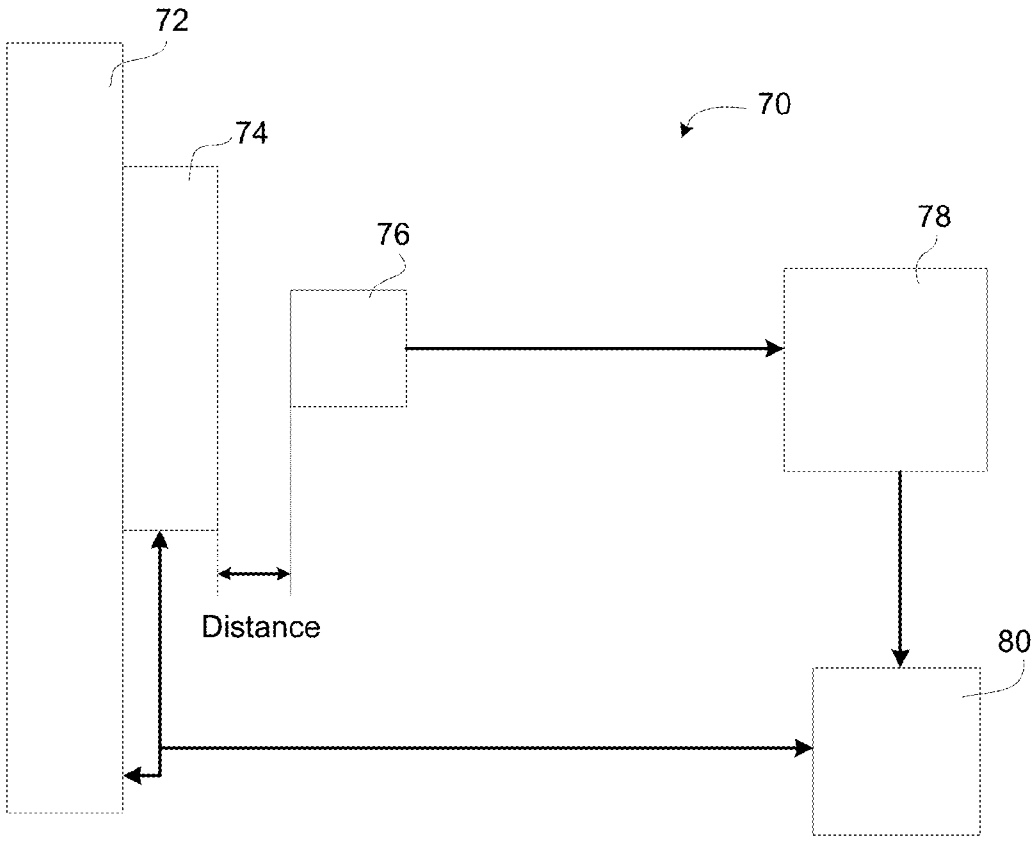
FIG. 2 includes a schematic block diagram of a system for detecting light illuminance as a function of distance.

FIG. 2 includes a schematic block diagram of a system for detecting light illuminance as a function of distance. Referring to FIG. 2, system 70 includes a flat surface light source 74, which can be, for example, an A32700799 (136 mm×136 mm) light source, manufactured and sold by Chroma Ate Inc. (66, Hwa-ya 1st Rd., Hwa-Ya Technology Park, Kuei-Shan Hsiang, Taoyuan Hsien 333, Taiwan). Light source 74 can be mounted on a movable, controllable X-Y table 72 to ensure accurate control of Distance between light source 74 and sensor 76. According to the present disclosure, a 120 mm×120 mm area of light source 74 is investigated. Light source 74 is used to illuminate sensor 76, which is coupled to an illuminance meter 78, which can be, for example, a Minolta Model T-10 Lux Meter, which measures illuminance. A computer 80 is coupled to meter 78, light source 74 and X-Y table 72 to control the performance of the test.

Figure 3:
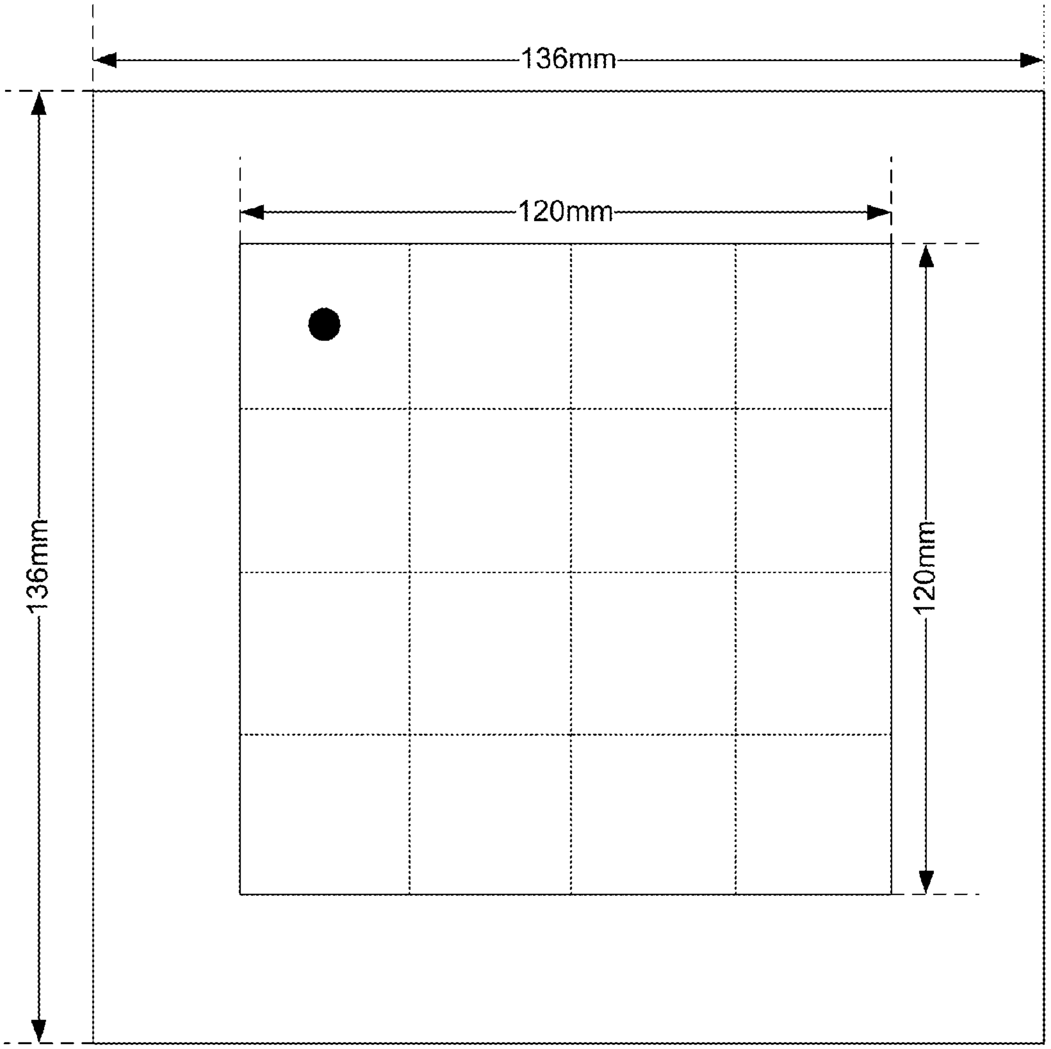
FIG. 3 includes a schematic diagram of a 120 mm×120 mm area of a light source tested during the experiment of FIG. 2.
Figure 4A:
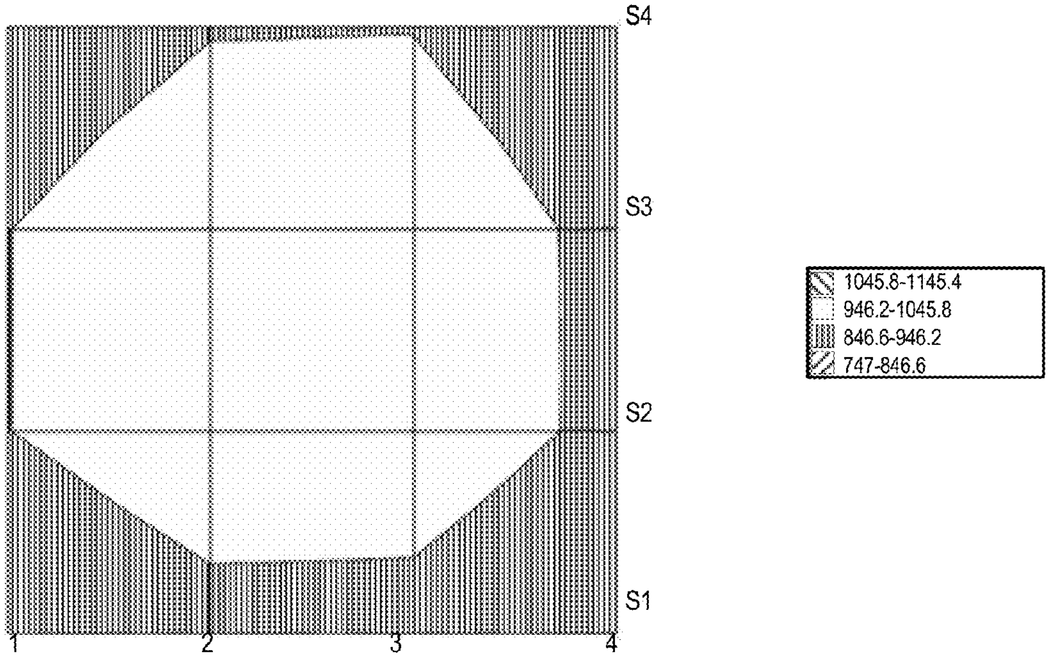
FIGS. 4A through 4F include contour line plots of the results of the distance-luminance experiment for the six combinations of distance and light source output, tested in the experiment of FIGS. 2 and 3.
Figure 4B:
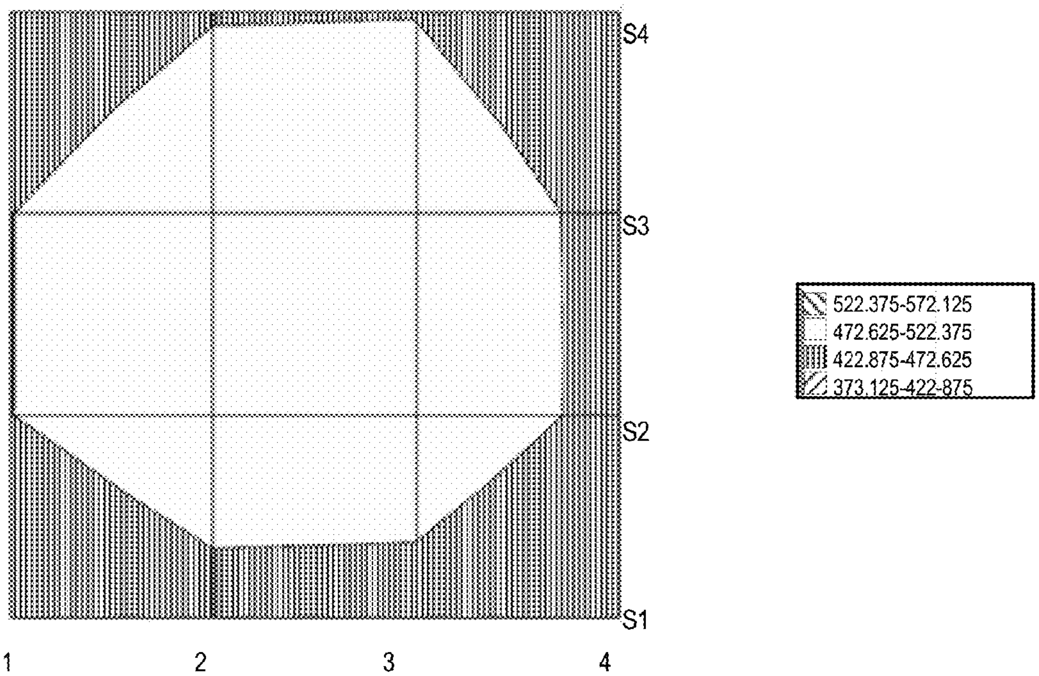
Figure 4C:
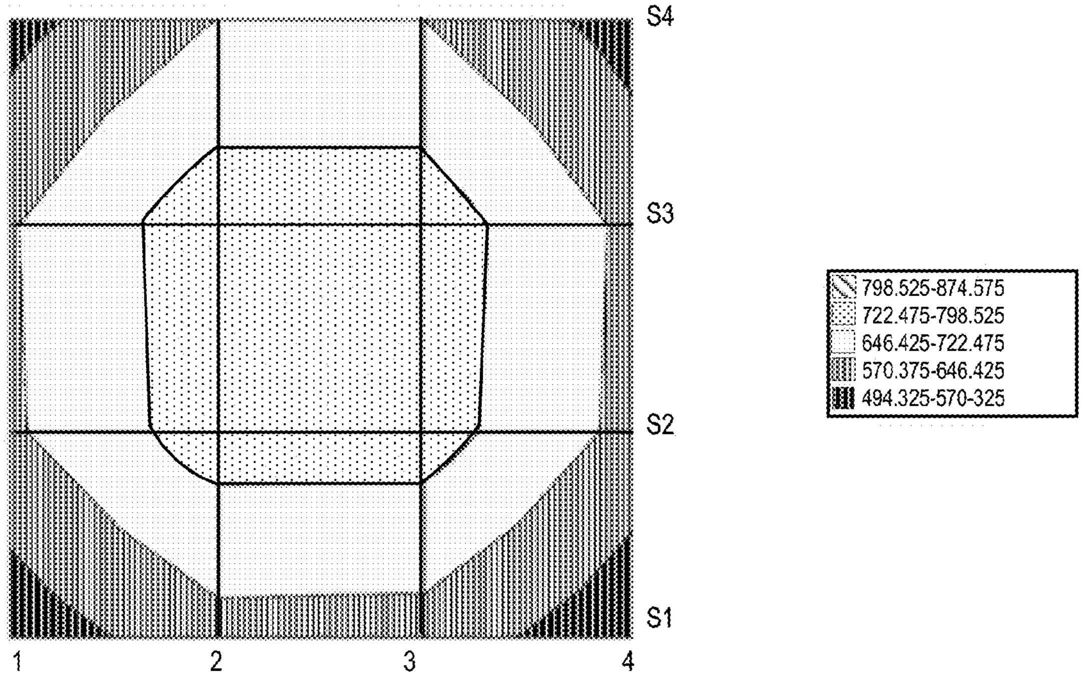
Figure 4D:
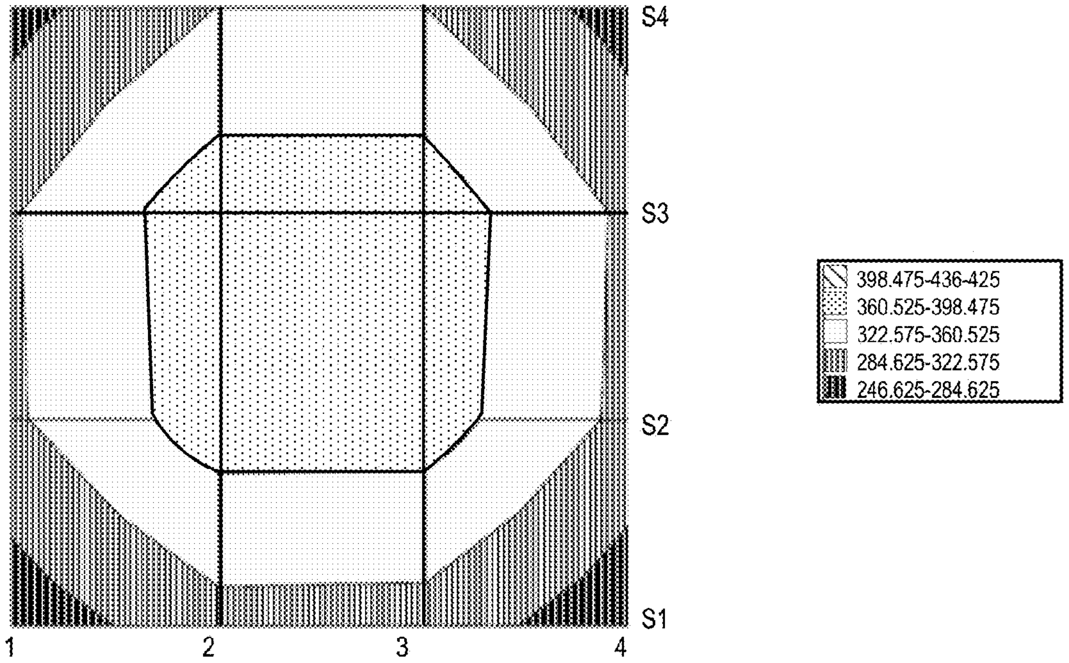
Figure 4E:
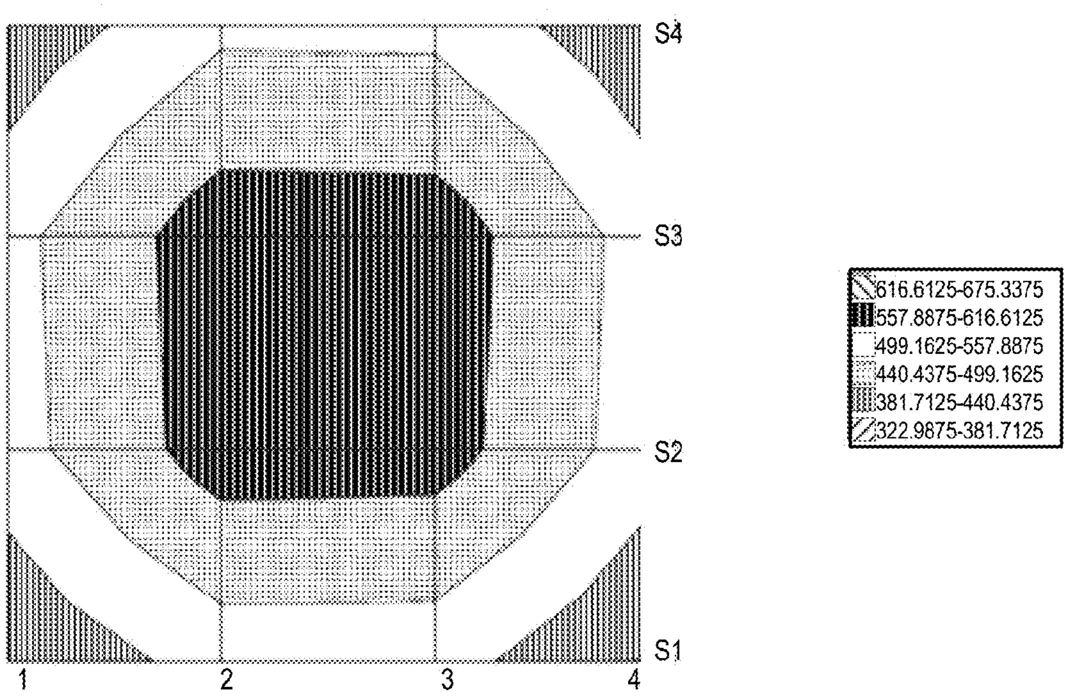
Figure 4F:
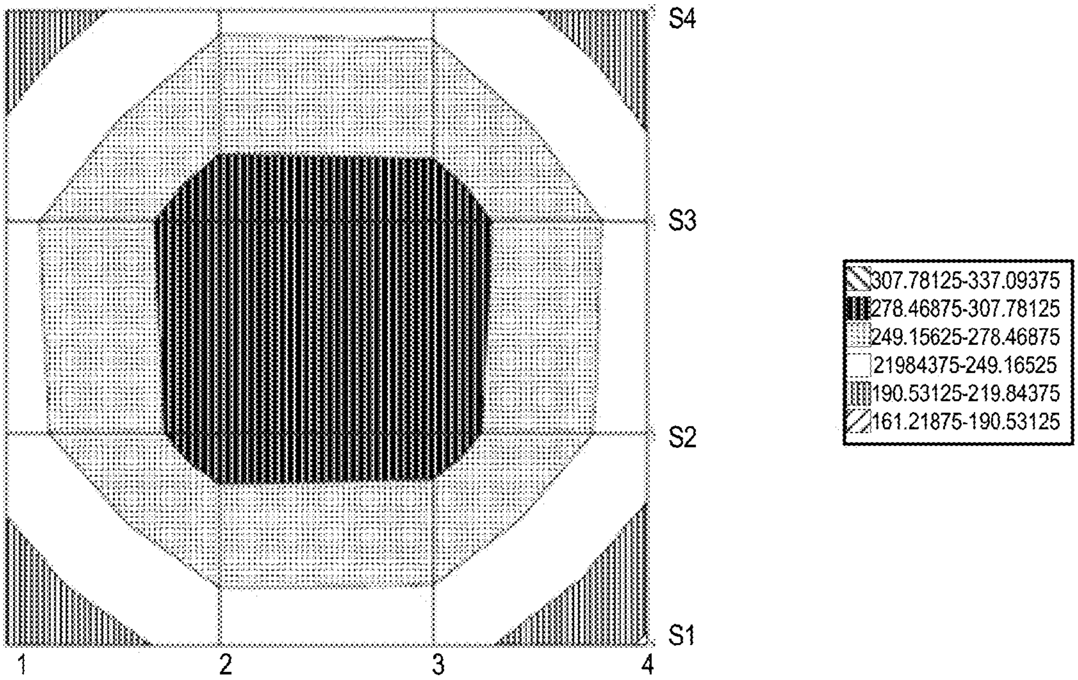

FIG. 3 includes a schematic diagram of a central 120 mm×120 mm light producing area of light source 74 that is tested during the experiment. Referring to FIG. 3, the central 120 mm×120 mm light producing area that is being tested is divided into sixteen smaller areas, with the center point of each smaller area being designated with a solid dot. For this experiment, distance from light source 74 to the sensor 76 is set at three levels, namely, 2 mm, 22 mm and 42 mm. The output illuminance of light source 74 is set at two levels, namely, 1,000 lux and 500 lux. Altogether, six combinations of distance and light source output are tested. FIGS. 4A through 4F include contour line plots of the results of the distance-luminance experiment for the six combinations of distance and light source output. Specifically, FIG. 4A is a contour line plot for a distance of 2 mm and light source output of 1000 lux; FIG. 4B is a contour line plot for a distance of 2 mm and light source output of 500 lux; FIG. 4C is a contour line plot for a distance of 22 mm and light source output of 1000 lux; FIG. 4D is a contour line plot for a distance of 22 mm and light source output of 500 lux; FIG. 4E is a contour line plot for a distance of 42 mm and light source output of 1000 lux; FIG. 4F is a contour line plot for a distance of 42 mm and light source output of 500 lux. The results are presented in the contour line (isoline) plots in FIGS. 4A through 4F to convey a visual representation of the distribution of illuminance. In FIGS. 4A through 4F, each contour line plot contains 16 vertices, which correspond to the 16 center points as shown in FIG. 3.

Referring to FIGS. 4A through 4F, it is readily apparent that uniformity is not significantly affected by light source output illuminance. Specifically, comparing FIGS. 4A to 4B, 4C to 4D and 4E to 4F, it can be seen that the change in light source illuminance output from 1000 to 500 lux has very little effect on uniformity. However, it can also readily be observed in FIGS. 4A through 4F that change in distance between the light source and the sensor does have a significant impact on the uniformity. Therefore, it can be concluded that illuminance uniformity decreases as the distance to the light source increases. Also, the rate of decrease of illuminance uniformity is more pronounced when the distance is relatively small. Specifically, in a current multi-site probe card working distance of approximately 25 mm, the illuminance is significantly non-uniform.

According to the present disclosure, the problem of a working distance required to accommodate components of the testing system presenting non-uniform illuminance is solved by positioning a control ring member between the light source and the probe card. In some exemplary embodiments, the control ring member includes sixteen (16) movable aperture elements, for example, ring units, which in some exemplary embodiments are arranged in a 4×4 matrix configuration. The 16 ring units correspond to the 16 probe card units 21 (see FIGS. 1A and 1B) for simultaneous optical testing of 16 dies on a wafer 12.

Figure 5A:
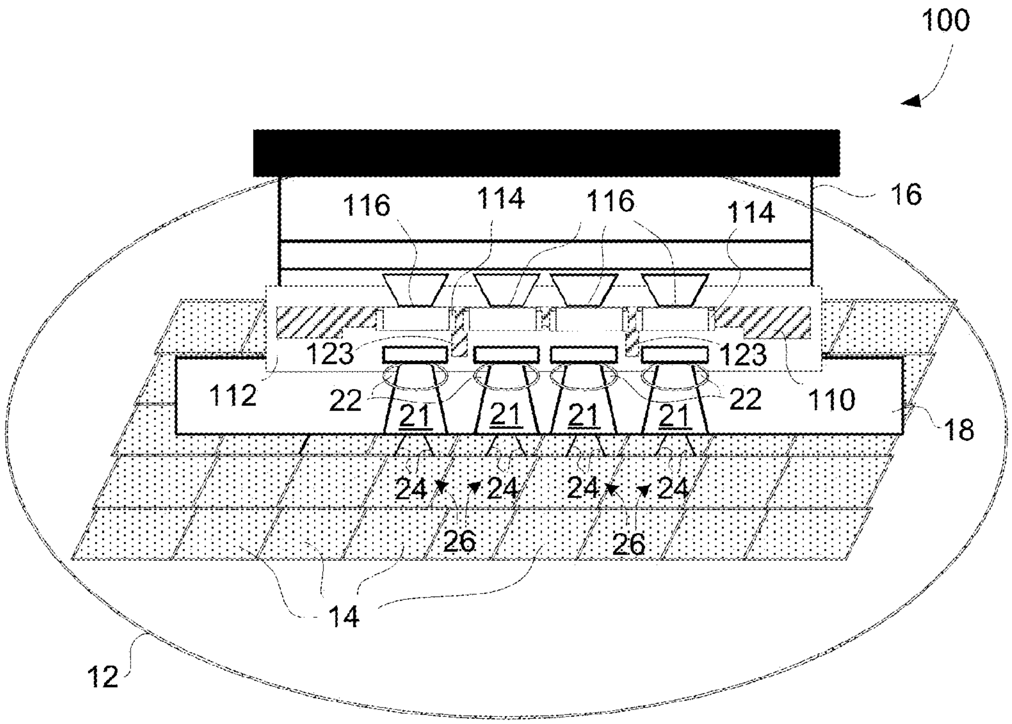
FIG. 5A includes a schematic perspective view of a system used to test a wafer on which a plurality of image sensors is formed, including a control ring member, according to some exemplary embodiments.
Figure 5B:
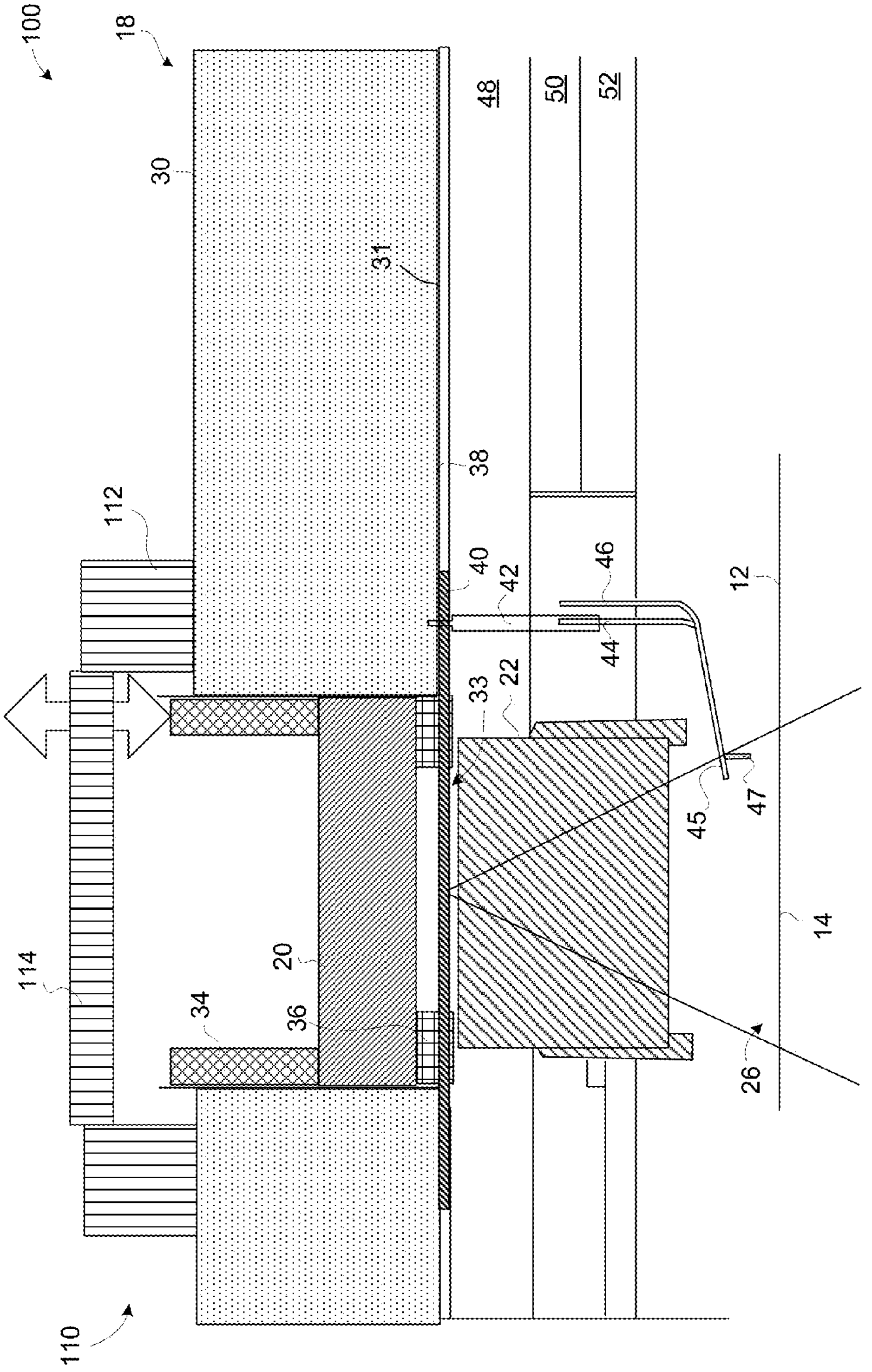
FIG. 5B includes a detailed schematic cross-sectional view of a portion of the system illustrated in FIG. 5A, including a control ring member, according to some exemplary embodiments.

FIG. 5A includes a schematic perspective view of a system 100 used to test a wafer on which a plurality of image sensors are formed, including a control ring member, according to some exemplary embodiments. FIG. 5B includes a detailed schematic cross-sectional view of a portion of system 100 illustrated in FIG. 5A, including a control ring member 110, according to some exemplary embodiments. Certain elements illustrated in FIGS. 5A and 5B are the same as elements illustrated and described above in connection with FIGS. 1A and 1B. Those like elements are identified by like reference numerals. Detailed description of those like elements will not be repeated.

Referring to FIGS. 5A and 5B, the control ring member 110 is placed on top of probe card 18. Control ring member 110 includes a ring holder 112 and at least one ring 114 held in ring holder 112. A plurality of supports 123 on the bottom side of ring holder 112 support ring control ring member 110 on probe card 18. An inner aperture 116 of each ring 114 is aligned with its corresponding diffuser 20 and lens 22 of its corresponding probe card unit 21, thereby forming a light path from light source 16 to the corresponding image sensor 14 below at the corresponding image sensor test site 26 that is being tested. Light from light source 16 above control ring member 110 passes through ring 114 before it reaches the corresponding diffuser 20 and lens 21, and eventually the corresponding image sensor test site 26 on wafer 12 below.

Each ring 114 is held in ring holder 112 such that it can be moved up or down along the light path that is defined through its aperture. This movement can be implemented, for example, by a mating thread on the outside diameter of ring 114 and inside diameter of a hole in ring holder 112 in which ring 114 is held. In this case, each ring 114 can be adjusted up or down by turning the ring, such as by a key or screwdriver or other such device mated with a notch or slot in the upper annular surface of ring 114. Alternatively, the inner annulus of ring 114 may be shaped as a polygon instead of a circle, so that a hex key, for example, such as an Allen wrench, may be used to rotate ring 114 to move it up or down. By moving ring 114 up or down, i.e., towards or away from light source 16, the amount of light flux that eventually reaches wafer 12 may be individually adjusted for each of the image sensor test sites 26. Therefore, although the illuminance from light source 16 is non-uniform initially, the light impinging on the wafer 12 at the 16 image sensor test sites 26 can be made uniform by individually adjusting each of the 16 rings 114.

Figure 5C:
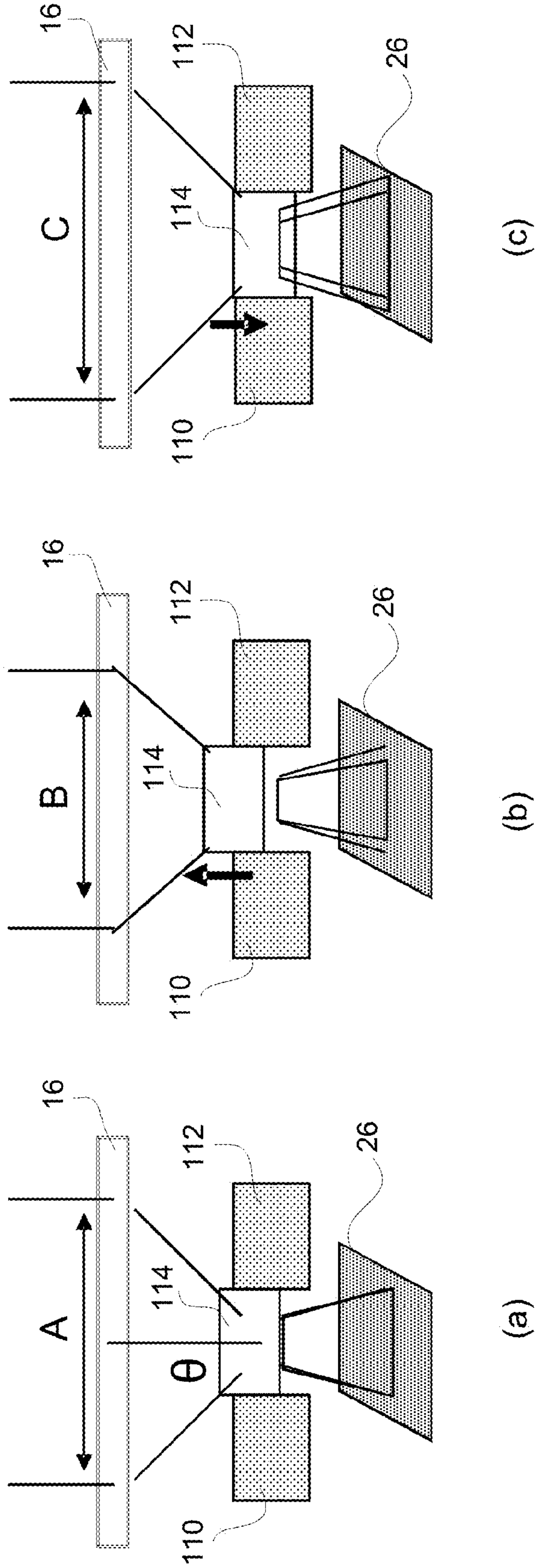
FIG. 5C includes schematic block diagrams of a test system according to some exemplary embodiments illustrating three different positions of a ring in three diagrams labeled (a), (b) and (c), respectively.
Figure 5D:
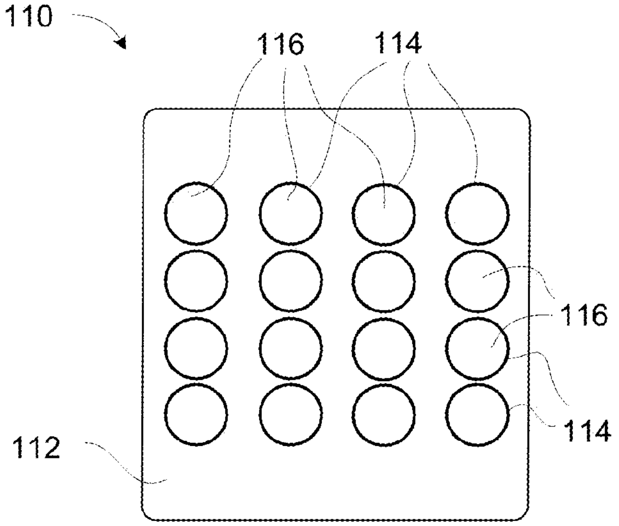
FIG. 5D includes a schematic plan view of a control ring member, according to some exemplary embodiments.
Figure 5E:
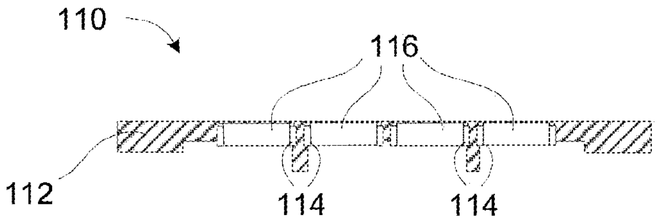
FIG. 5E includes a schematic side view of a control ring member, according to some exemplary embodiments.
Figure 5F:
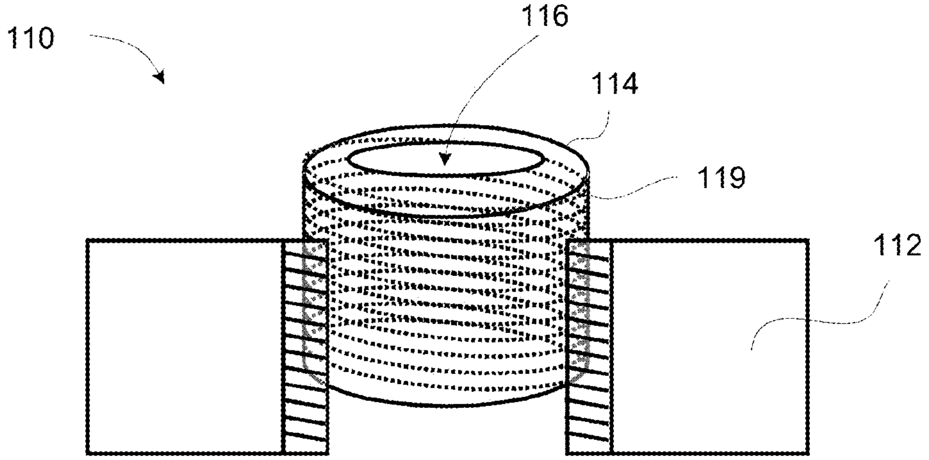
FIG. 5F includes a schematic partially perspective view of a control ring member, according to some exemplary embodiments.

FIG. 5C includes schematic block diagrams of test system 100 according to some exemplary embodiments, illustrating three different positions of ring 114 of the disclosure in three diagrams labeled (a), (b) and (c), respectively. In diagram (a), ring 114 is in a neutral or standard position; in diagram (b), ring 114 is in a raised position with respect to the neutral or standard position; and in diagram (c), ring 114 is in a lowered position with respect to the neutral or standard position. FIG. 5D includes a schematic plan view of control ring member 110, according to some exemplary embodiments. FIG. 5E includes a schematic side view of control ring member 110, according to some exemplary embodiments. FIG. 5F includes a schematic partial perspective view of control ring member 110, according to some exemplary embodiments.

Referring to FIGS. 5A through 5F, control ring member 110 is positioned above probe card 18 and below flat surface light source 16. The inside diameter (ID) of the annulus-shaped ring 114, i.e., the diameter of aperture 116 in ring 114, is given by Φ, the distance between the top of ring 114 and light source 16 is H, and the view angle is θ, as shown in FIG. 5C. Also, the illuminance density of light source 16 is designated as ρ, and is approximated to be a constant for illustrative purposes in this detailed description. Then, illuminance I(H, Φ) may be considered to be a function of H and Φ:

$$I(H, \Phi) = \frac{\pi}{4}\rho(\Phi + 2H \cdot \tan(\theta))^2$$

ID Φ provides a first variable used to tune illuminance I. A larger Φ allows for larger I. After Φ is selected, distance H provides a second variable which can be used to fine tune I. In some exemplary embodiments, a typical value of H is 4 to 8 mm; and a typical value of Φ is 6 to 10 mm. As an illustrative example, it is assumed that the view angle θ is 45 degrees.

For purposes of illustration, it is assumed that the first variable Φ is selected to be 8 mm. To further fine tune illuminance I, the second variable H is to be adjusted. According to some exemplary embodiments, H can first be set at 6 mm as a base level. If it is desired to decrease the illuminance, ring 114 can be moved up towards light source 16 such as by turning ring 114, such that H adjusted to 4.5 mm, for example. This will decrease the illuminance by about 44%. On the other hand, if it is desired to increase the illuminance, ring 114 can be moved downward away from light source 16, so that H is adjusted to 8.5 mm, for example. This will increase the illuminance by about 101%.

In some particular exemplary embodiments, the ID Φ of aperture 116 in ring 114 can be set at one of, for example, three possible values. In some particular exemplary embodiments, these three values are 6 mm, 8 mm and 10 mm. In some particular exemplary embodiments, the thickness of ring 114, i.e., outer diameter (OD) of ring 114 less inner diameter Φ, is typically approximately 2 mm. Therefore, in some particular exemplary embodiments, the OD of ring 114 is approximately 8 mm, 10 mm or 12 mm. In some exemplary embodiments, the height of ring 114 can be approximately 3 mm. In some exemplary embodiments, the thread 119 on ring 114 can be 0.5 mm per turn.

Figure 6A:
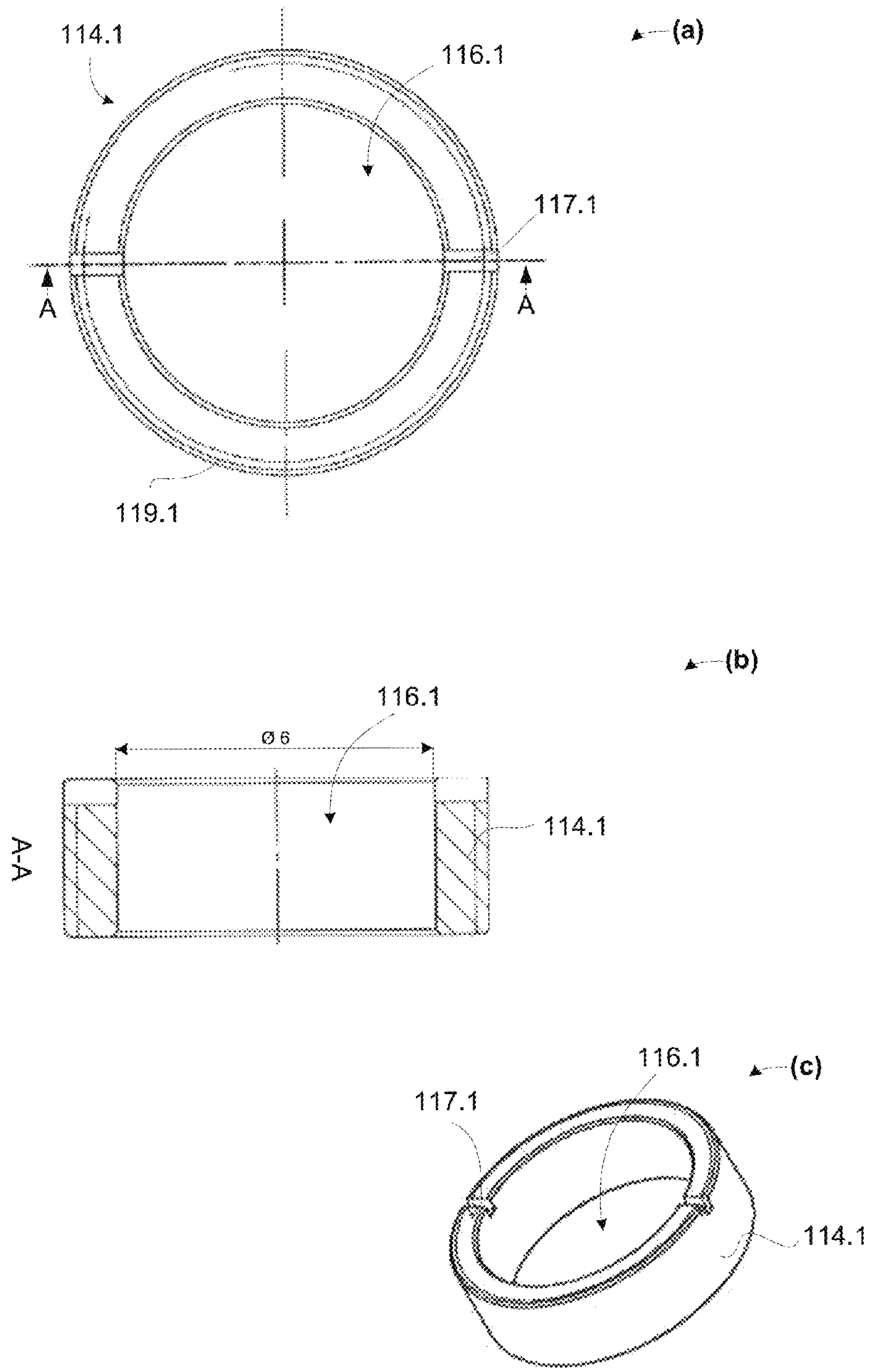
FIG. 6A includes a schematic top view (a) of a ring, a schematic cross-sectional view (b) of the ring 114.1 taken along line A-A of view (a), and a schematic perspective view (c) of the ring, according to some particular exemplary embodiments.
Figure 6B:
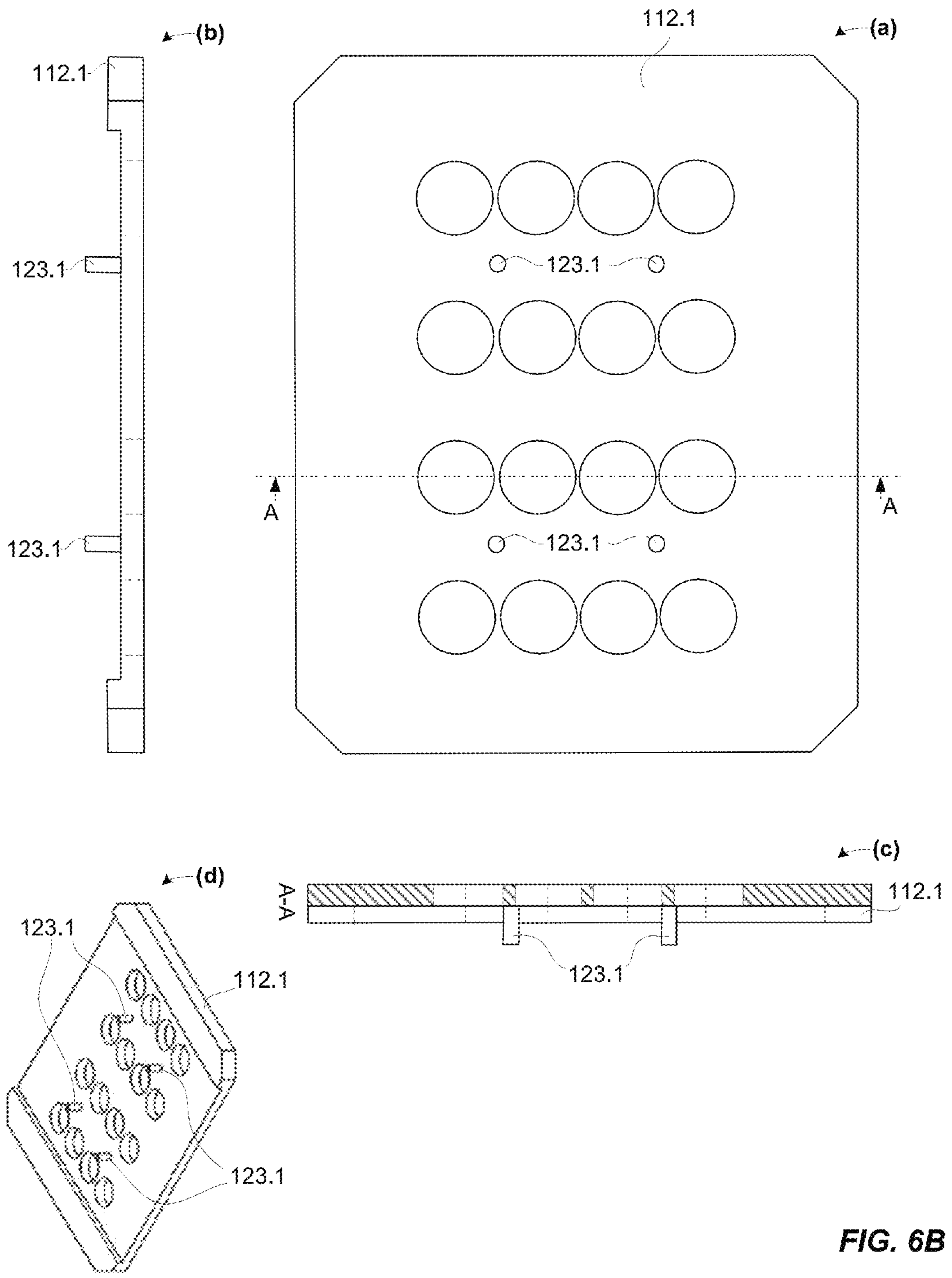
FIG. 6B includes a schematic top view (a) of a ring holder for the ring of FIG. 6A, a schematic side view (b) of the ring holder for the ring of FIG. 6A, a schematic cross-sectional view (c) of the ring holder for the ring of FIG. 6A taken along line A-A of view (a) of FIG. 6B, and a schematic perspective view (d) of the ring holder for the ring of FIG. 6A, according to some particular exemplary embodiments.
Figure 7A:
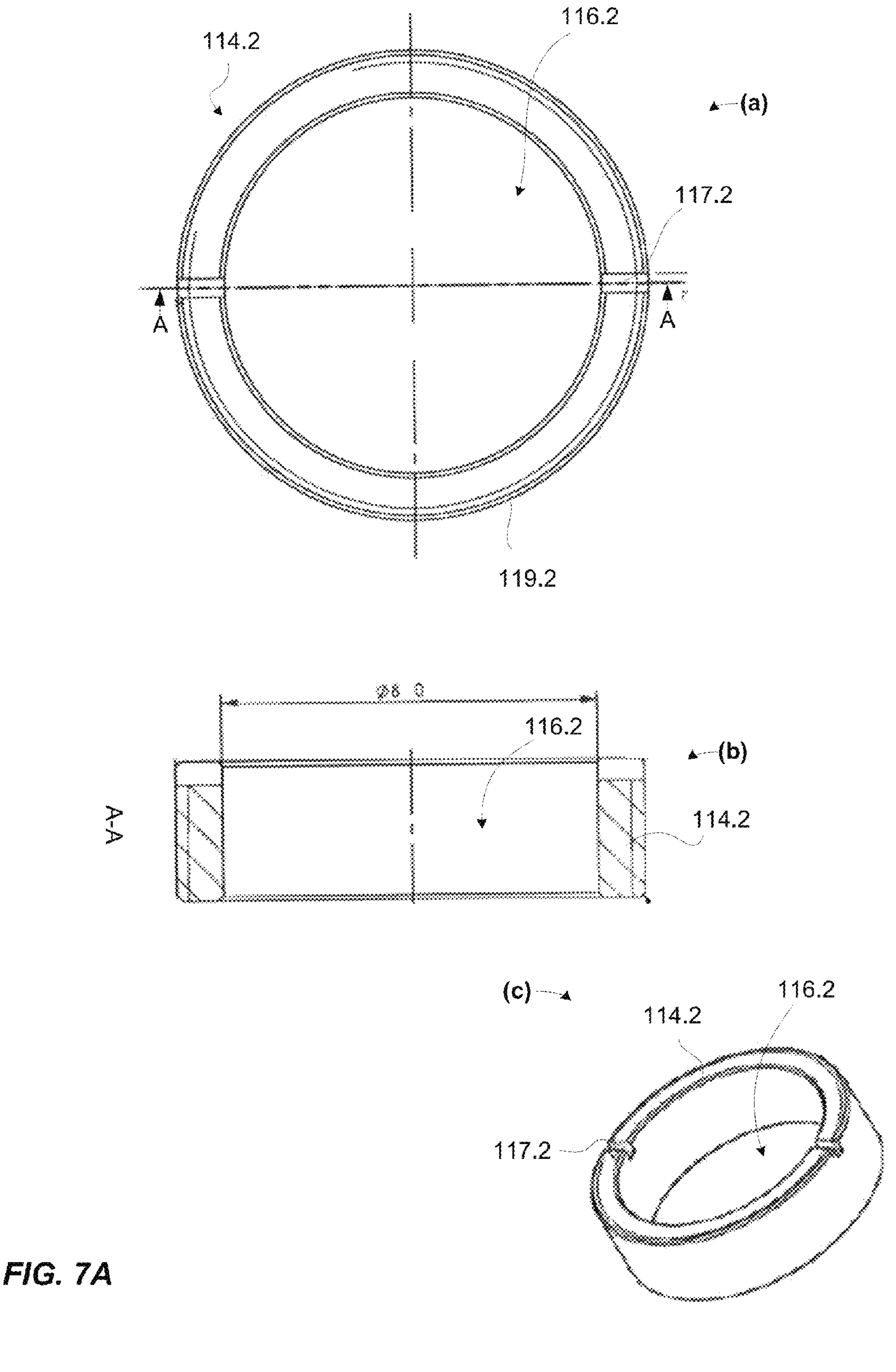
FIG. 7A includes a schematic top view (a) of a ring, a schematic cross-sectional view (b) of the ring taken along line A-A of view (a), and a schematic perspective view (c) of the ring, according to some particular exemplary embodiments.
Figure 7B:
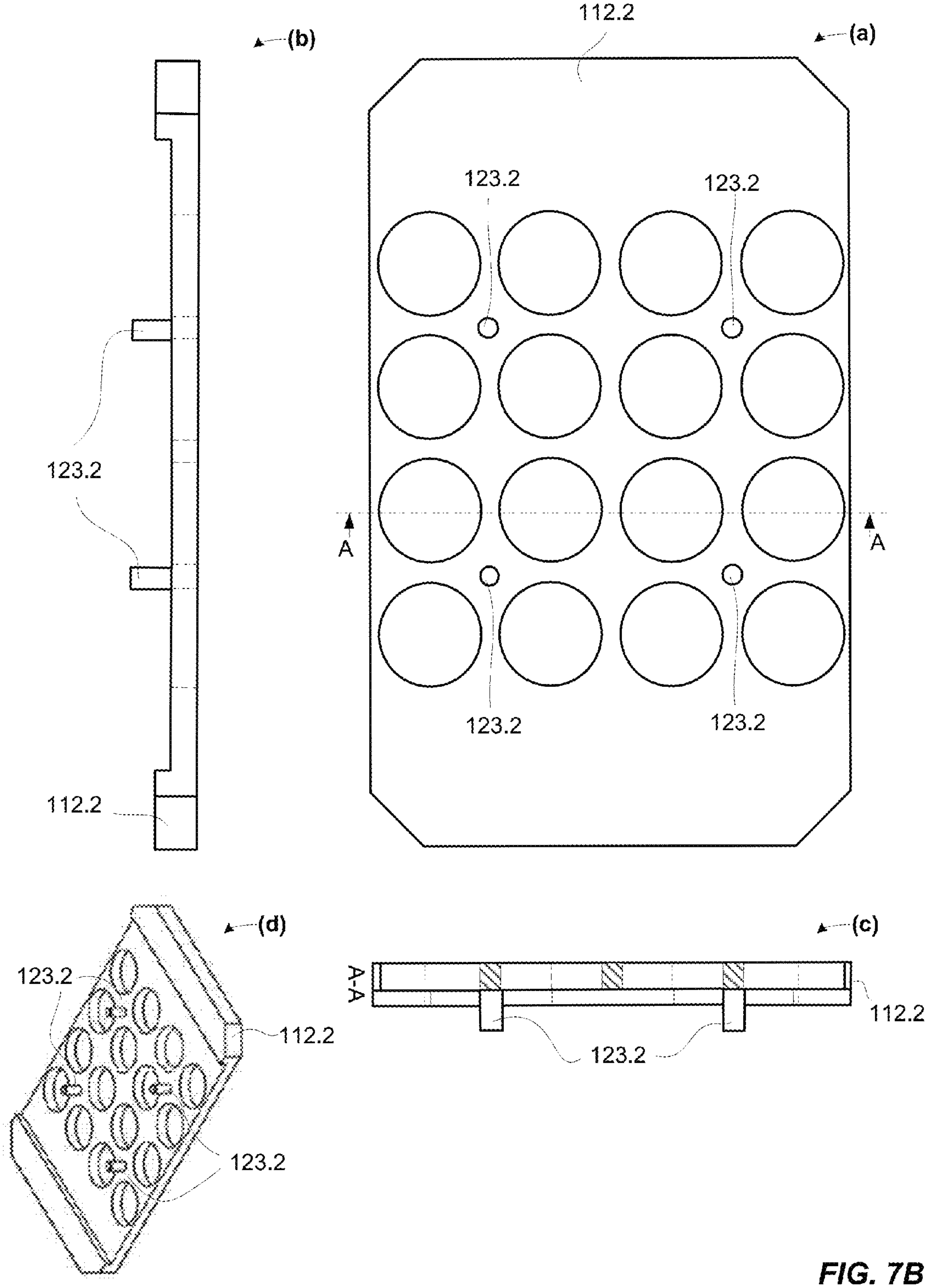
FIG. 7B includes a schematic top view (a) of a ring holder for the ring of FIG. 7A, a schematic side view (b) of the ring holder for the ring of FIG. 7A, a schematic cross-sectional view (c) of the ring holder for the ring of FIG. 7A taken along line A-A of view (a) of FIG. 7B, and a schematic perspective view (d) of the ring holder for the ring of FIG. 7A, according to some particular exemplary embodiments.
Figure 8A:
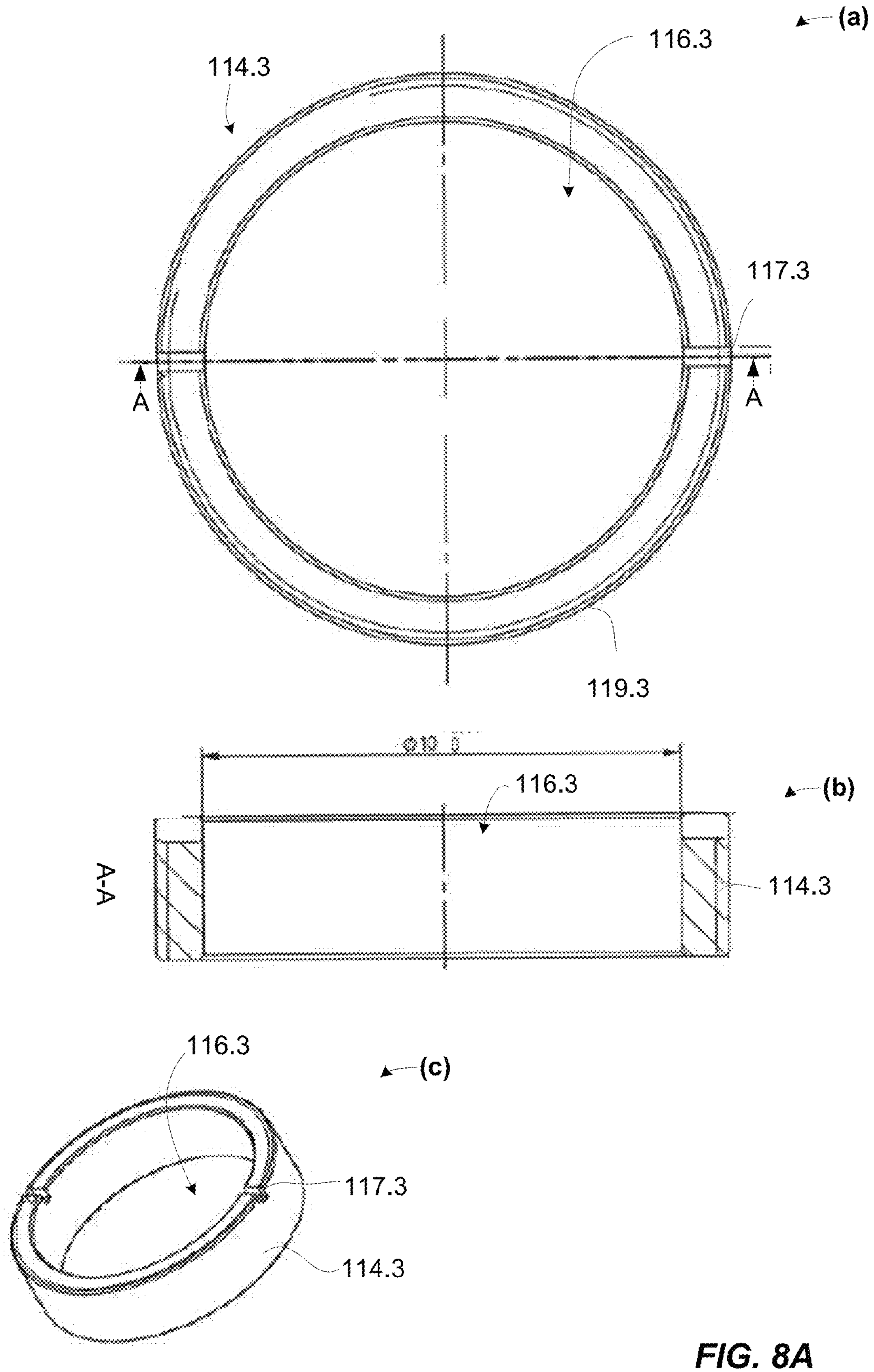
FIG. 8A includes a schematic top view (a) of a ring, a schematic cross-sectional view (b) of the ring taken along line A-A of view (a), and a schematic perspective view (c) of the ring, according to some particular exemplary embodiments.
Figure 8B:
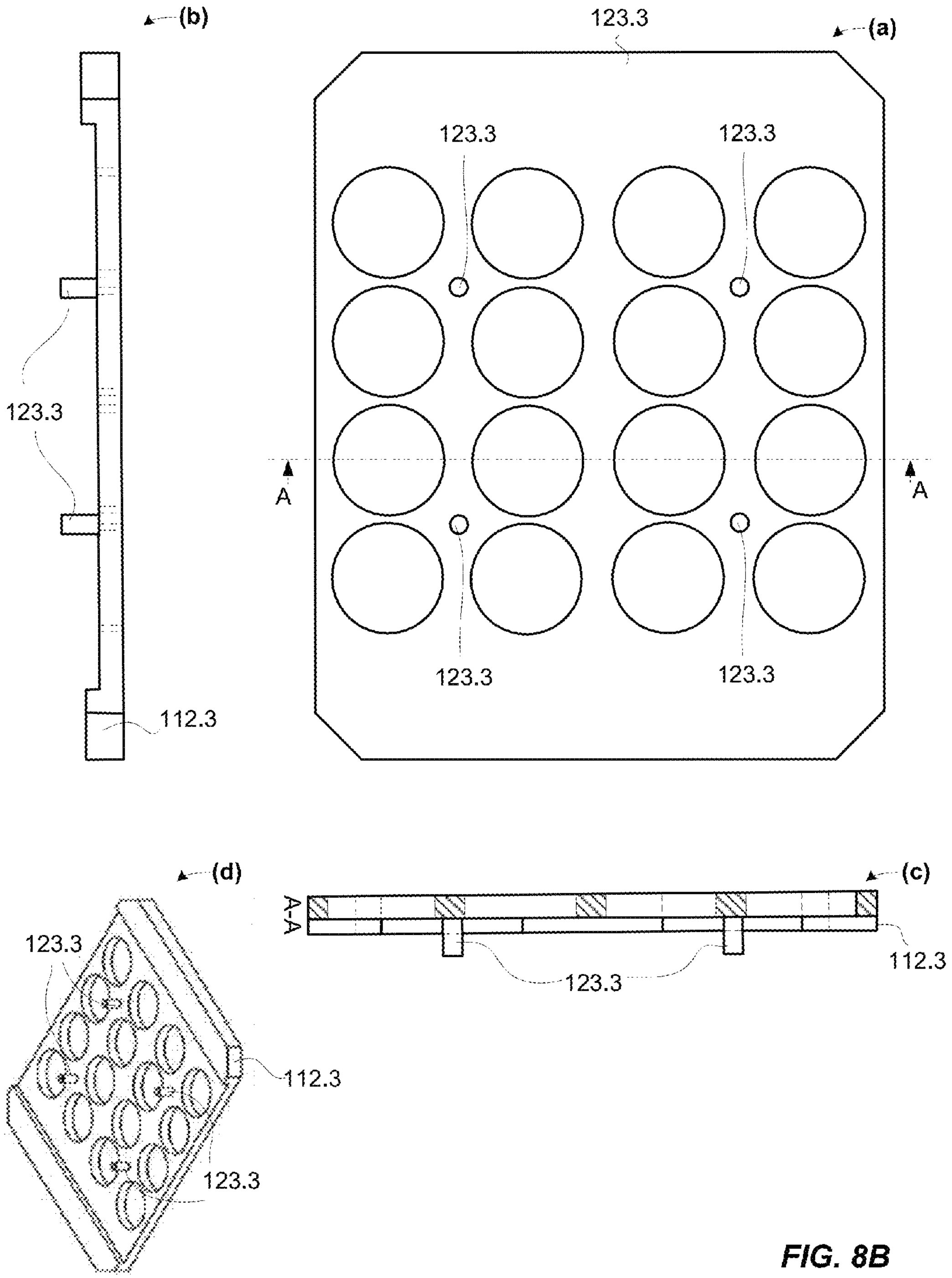
FIG. 8B includes a schematic top view (a) of a ring holder for the ring of FIG. 8A, a schematic side view (b) of the ring holder for the ring of FIG. 8A, a schematic cross-sectional view (c) of the ring holder for the ring of FIG. 8A taken along line A-A of view (a) of FIG. 8B, and a schematic perspective view (d) of the ring holder for the ring of FIG. 8A, according to some particular exemplary embodiments.

FIG. 6A includes a schematic top view (a) of ring 114.1, a schematic cross-sectional view (b) of ring 114.1 taken along line A-A of view (a), and a schematic perspective view (c) of ring 114.1, according to some particular exemplary embodiments. FIG. 6B includes a schematic top view (a) of ring holder 112.1 for ring 114.1 of FIG. 6A, a schematic side view (b) of ring holder 112.1 for ring 114 of FIG. 6A, a schematic cross-sectional view (c) of ring holder 112.1 taken along line A-A of view (a) of FIG. 6B for ring 114.1 of FIG. 6A, and a schematic perspective view (d) of ring holder 112.1 for ring 114.1 of FIG. 6A, according to some particular exemplary embodiments. FIG. 7A includes a schematic top view (a) of ring 114.2, a schematic cross-sectional view (b) of ring 114.2 taken along line A-A of view (a), and a schematic perspective view (c) of ring 114.2, according to some particular exemplary embodiments. FIG. 7B includes a schematic top view (a) of ring holder 112.2 for ring 114.2 of FIG. 7A, a schematic side view (b) of ring holder 112.2 for ring 114.2 of FIG. 7A, a schematic cross-sectional view (c) of ring holder 112.2 taken along line A-A of view (a) of FIG. 7B for ring 114.2 of FIG. 7A, and a schematic perspective view (d) of ring holder 112.2 for ring 114.2 of FIG. 7A, according to some particular exemplary embodiments. FIG. 8A includes a schematic top view (a) of ring 114.3, a schematic cross-sectional view (b) of ring 114.3 taken along line A-A of view (a), and a schematic perspective view (c) of ring 114.3, according to some particular exemplary embodiments. FIG. 8B includes a schematic top view (a) of ring holder 112.3 for ring 114.3 of FIG. 8A, a schematic side view (b) of ring holder 112.3 for ring 114.3 of FIG. 8A, a schematic cross-sectional view (c) of ring holder 112.3 taken along line A-A of view (a) of FIG. 8B for ring 114.3 of FIG. 8A, and a schematic perspective view (d) of ring holder 112.3 for ring 114.3 of FIG. 8A, according to some particular exemplary embodiments.

In the embodiments of FIGS. 6A and 6B, ring 114.1 has an ID of approximately 6 mm and an OD of approximately 8 mm. In the embodiments of FIGS. 7A and 7B, ring 114.2 has an ID of approximately 8 mm and an OD of approximately 10 mm. In the embodiments of FIGS. 8A and 8B, ring 114.3 has an ID of approximately 10 mm and an OD of approximately 12 mm.

Referring to FIGS. 6A and 6B, in some exemplary embodiments, the outer surface of ring 114.1 is formed with threads 119.1 for mating with threads in ring holder 112.1. Ring 114.1 includes slot or groove 117.1 for mating with a tool such as a screwdriver to permit rotation of ring 114.1 within ring holder 112.1 to adjust the height of ring 114.1 within ring holder 112.1 and, therefore, the distance between ring 114.1 and light source 16, such that illumination intensity at each image sensor test site 26 is adjustable. Ring holder 112.1 also includes a plurality of supports 123.1 for supporting ring holder 112.1 on probe card 18 (see FIG. 5A).

Referring to FIGS. 7A and 7B, in some exemplary embodiments, the outer surface of ring 114.2 is formed with threads 119.2 for mating with threads in ring holder 112.2. Ring 114.2 includes slot or groove 117.2 for mating with a tool such as a screwdriver to permit rotation of ring 114.2 within ring holder 112.2 to adjust the height of ring 114.2 within ring holder 112.2 and, therefore, the distance between ring 114.2 and light source 16, such that illumination intensity at each image sensor test site 26 is adjustable. Ring holder 112.2 also includes a plurality of supports 123.2 for supporting ring holder 112.2 on probe card 18 (see FIG. 5A).

Referring to FIGS. 8A and 8B, in some exemplary embodiments, the outer surface of ring 114.3 is formed with threads 119.3 for mating with threads in ring holder 112.3. Ring 114.3 includes slot or groove 117.3 for mating with a tool such as a screwdriver to permit rotation of ring 114.3 within ring holder 112.3 to adjust the height of ring 114.3 within ring holder 112.3 and, therefore, the distance between ring 114.3 and light source 16, such that illumination intensity at each image sensor test site 26 is adjustable. Ring holder 112.3 also includes a plurality of supports 123.3 for supporting ring holder 112.3 on probe card 18 (see FIG. 5A).

Figure 9:
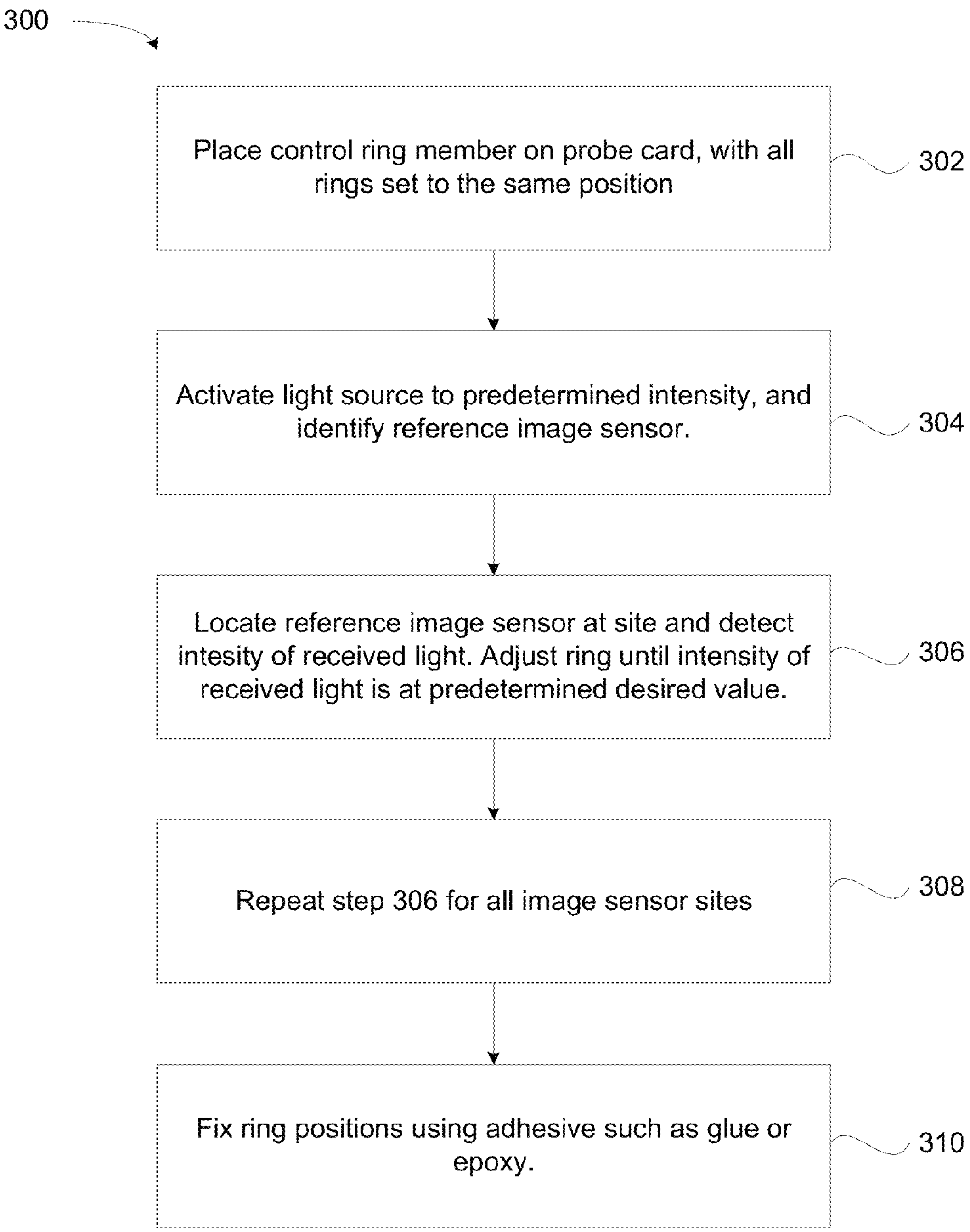
FIG. 9 includes a schematic logical flow diagram of steps in a process of adjusting rings in a control ring member such that test illumination received at a plurality of test sites is uniform, according to some exemplary embodiments.

FIG. 9 includes a schematic logical flow diagram of steps in a process of adjusting rings in a control ring member such that test illumination received at a plurality of test sites is uniform, according to some exemplary embodiments. According to this calibration process, a single reference test image sensor is used to measure the individual illuminance at each of the test sites, e.g., 16 test sites, individually. For this calibration, light source 16 is activated, and control ring member 110 is positioned over probe card 18. The reference image sensor is positioned at each test site, one at a time. At each test site, a determination is made as to whether an adjustment in illumination is desirable. If so, ring 114 at that site is adjusted appropriately, either up or down, to achieve the desired illumination intensity. This process continues until all of the test sites have been measured and appropriate ring adjustments have been made, such that the intensity of the illumination at all 16 sites is uniform, and accurate simultaneous multi-site testing can be carried out.

Referring to FIG. 9, the process 300 begins in step 302 in which control ring member 110 is placed on top of probe card 18. In this initial setup, all of rings 114, e.g., all 16 of rings 114, are set to the same height. For example, all of rings 114 may be set to the neutral position illustrated in FIG. 5C (a). Next, in step 304, light source 16 is activated and set to a predetermined intensity level, and a reference image sensor chip or die is identified. Next, in step 306, the reference image sensor chip is located at one of the test sites to be used in subsequent testing. The intensity of the light detected by the reference image sensor is adjusted by adjusting the ring at the test site until the detected intensity is set to a desired predetermined value. Next, as shown in step 308, step 306 is repeated for all of the rings and respective image sensor test sites, such that the entire control ring member is calibrated. Next, in step 310, the calibration process is completed by fixing the rings in their adjusted positions such as by applying an adhesive such as glue or epoxy to the rings.

FIG. 10 includes a table which tabulates illumination test data for a plurality of test sites comparing a test system configuration in which the ring control member of the present disclosure is not used to provide uniform illumination at the plurality of test sites with a test system configuration in which the ring control member according to the present disclosure is used to provide uniform illumination at the plurality of test sites.

First, as a control experiment, a conventional light source with non-uniform illuminance was used to illuminate a wafer for optical testing without using the ring control member of the present disclosure. The results are listed on the left side of the table in FIG. 10. MeanR is the mean of red light signals. MeanG1 and MeanG2 are means of the two green light signals. MeanB is the mean of the blue light signals. The image sensor die reads light in red, green and blue components, using the Bayer pattern of color filters as commonly known in the art. The value areas are 8-bit digital numbers that are measured by the image sensor dies. Any of the red, green or blue light may be used in the operation of FIG. 9 to calibrate the rings for the 16 sites. In this example, the green light reading was used in the ring calibration. Therefore, the data in FIG. 10 show that the illuminance uniformity is the best with the green light component.

Next, the control ring member was inserted between the light source and the probe card, and the operational steps as set forth in FIG. 9 were carried out to adjust each ring and calibrate the control ring member. As a result, the illuminance of the light source became uniform of the 16 test sites. Optical testing was then carried out on the same wafer that was measured in the previous control experiment. The results are listed on the right side of the table in FIG. 10.

Referring to FIG. 10, 16 test sites were tested and results are tabulated accordingly. Maximum and minimum values, maximum and minimum ranges (Max-Min), as well as average and deviation ratios were computed and tabulated for each site. It is noted that the smaller the Max-Min range and deviation ratio, the more uniform the readings are among the 16 sites. FIG. 10 shows that by using the control ring member with its operating/calibration procedure as shown in FIG. 9, illuminance can be made uniform throughout the 16 sites.

Combinations of Features

Various features of the present disclosure have been described above in detail. The disclosure covers any and all combinations of any number of the features described herein, unless the description specifically excludes a combination of features. The following examples illustrate some of the combinations of features contemplated and disclosed herein in accordance with this disclosure.

In any of the embodiments described in detail and/or claimed herein, the feature of the light changed by moving one of the plurality of aperture elements can be illuminance of the light incident on the associated target.

In any of the embodiments described in detail and/or claimed herein, at least one of the plurality of aperture elements can be moved such that uniformity of illuminance of the light incident on the plurality of targets can be increased.

In any of the embodiments described in detail and/or claimed herein, each aperture can have a selectable inside diameter such that the illuminance at the associated target can be adjustable.

In any of the embodiments described in detail and/or claimed herein, if the inside diameter of the aperture is increased, the illuminance at the associated target can be increased, and, if the inside diameter of the aperture is decreased, the illuminance at the associated target can be decreased.

In any of the embodiments described in detail and/or claimed herein, each aperture element can be movable such that a distance between the aperture element and the light source can be adjustable, such that the illuminance at the associated target can be adjustable.

In any of the embodiments described in detail and/or claimed herein, if the distance between the aperture element and the light source is increased, the illuminance at the associated target can be increased, and, if the distance between the aperture element and the light source is decreased, the illuminance at the associated target can be decreased.

In any of the embodiments described in detail and/or claimed herein, the holder and aperture elements can be adapted to be calibrated to provide improved uniformity of illuminance at the plurality of targets by selecting a distance between each aperture element and the light source by selectively moving the aperture elements to adjust illuminance at a reference target element as it is temporarily individually associated with each aperture element.

In any of the embodiments described in detail and/or claimed herein, the plurality of targets can comprise a plurality of image sensor elements formed on a wafer.

In any of the embodiments described in detail and/or claimed herein, the holder and aperture elements can be adapted to be positioned between the light source and a probe card used in testing the image sensor elements formed on the wafer.

In any of the embodiments described in detail and/or claimed herein, the plurality of image sensor elements can be illuminated by the light source simultaneously such that the plurality of image sensor elements can be tested simultaneously.

In any of the embodiments described in detail and/or claimed herein, the plurality of aperture elements can be held within the holder by mating threads; and the plurality of aperture elements can be movable along their longitudinal axes by rotating the aperture elements about their longitudinal axes.

While the present disclosure has shown and described exemplary embodiments, it will be understood by those of ordinary skill in the art that various changes in form and details may be made therein without departing from the spirit and scope of the present disclosure, as defined by the following claims.

We claim:

1. An apparatus for adjusting intensity of light from a light source at a plurality of targets of the light, the apparatus comprising:

a plurality of moveable aperture elements, locatable between the light source and the targets, each aperture element defining an aperture through which the light passes from the light source to an associated one of the plurality of targets along a longitudinal axis of the aperture element; and a holder movably holding the plurality of moveable aperture elements, wherein each of the plurality of moveable aperture elements is individually and singularly moveable within the holder along the longitudinal axis of the aperture element to individually adjust an amount of light flux incident on the target associated with the aperture element, wherein the plurality of moveable aperture elements are held within the holder by mating threads, and the plurality of moveable aperture elements are moveable along their longitudinal axes by rotating the aperture elements about their longitudinal axes.

2. The apparatus of claim 1, wherein each aperture has an individually selectable inside diameter.

3. The apparatus of claim 1, wherein each aperture element is selectably movable such that a distance between the aperture element and the light source is adjustable.

4. The apparatus of claim 1, wherein each of the plurality of moveable aperture elements comprises an annulus-shaped ring, the annulus-shaped ring including a hollow center portion and a threaded outer portion for mating with the holder.

5. A system for testing an image sensor target, comprising:

a light source;

a probe card below the below the light source, the probe card including a plurality of probe card units corresponding to a respective plurality of image sensor test sites on a wafer; and an apparatus between the light source and the probe card for adjusting intensity of light from the light source at each of the plurality of probe card units, the apparatus including:

plurality of moveable aperture elements, located between the light source and the plurality of probe card units, each aperture element defining an aperture through which the light passes from the light source to an associated one of the plurality of probe card units along a longitudinal axis of the aperture element, and a holder movably holding the plurality of moveable aperture elements, wherein each of the plurality of moveable aperture elements is individually and singularly moveable within the holder along the longitudinal axis of the aperture element to individually adjust an amount of light flux incident on a respective one of the plurality of probe card units, wherein the plurality of moveable aperture elements are held within the holder by mating threads, and the plurality of moveable aperture elements are moveable along their longitudinal axes by rotating the aperture elements about their longitudinal axes.

* * * * *